United States Patent [19]

Minamida et al.

[11] Patent Number: 4,519,042
[45] Date of Patent: May 21, 1985

[54] METHOD OF INDICATING RESULTS OF COMBINATORIAL COMPUTATIONS

[75] Inventors: Kazukiyo Minamida; Yoshiharu Asai, both of Shiga, Japan

[73] Assignee: Kabushiki Kaisha Ishida Koki Seisakusho, Kyoto, Japan

[21] Appl. No.: 364,859

[22] PCT Filed: Aug. 13, 1981

[86] PCT No.: PCT/JP81/00176
§ 371 Date: Mar. 23, 1982
§ 102(e) Date: Mar. 23, 1982

[87] PCT Pub. No.: WO82/00711
PCT Pub. Date: Mar. 4, 1982

[30] Foreign Application Priority Data

Aug. 20, 1980 [JP] Japan .............................. 55-115009

[51] Int. Cl.³ ...................... G01G 13/00; G01G 19/42
[52] U.S. Cl. .................................... 364/567; 364/478; 177/25
[58] Field of Search ............... 364/466, 478, 479, 567, 364/568; 377/6, 7, 8, 13, 22; 177/1, 25

[56] References Cited

U.S. PATENT DOCUMENTS

| | | | |
|---|---|---|---|
| 3,636,327 | 1/1972 | Troutman | 364/568 |
| 3,742,232 | 6/1973 | Koehn et al. | 364/568 |
| 3,939,928 | 2/1976 | Murakami et al. | 177/25 |
| 4,267,894 | 5/1981 | Hirano et al. | 364/567 |
| 4,313,507 | 2/1982 | Hays | 364/567 |

FOREIGN PATENT DOCUMENTS 652590 3/1979 U.S.S.R. .............................. 364/567

Primary Examiner—Edward J. Wise
Attorney, Agent, or Firm—Armstrong, Nikaido, Marmelstein & Kubovcik

[57] ABSTRACT

An apparatus and method is disclosed for checking the operation of a combinatorial weighing or measuring apparatus to determine whether the weighing machines and the microcomputer which determines the optimum combination of objects are operating properly. The apparatus includes visual numerical displays, means for arranging and storing the numerical results of the combinatorial computations in the order of closest approximation to the desired set value, means for selectively visually displaying the numerical results, and means for indicating the respective rank of the displayed quantity.

6 Claims, 10 Drawing Figures

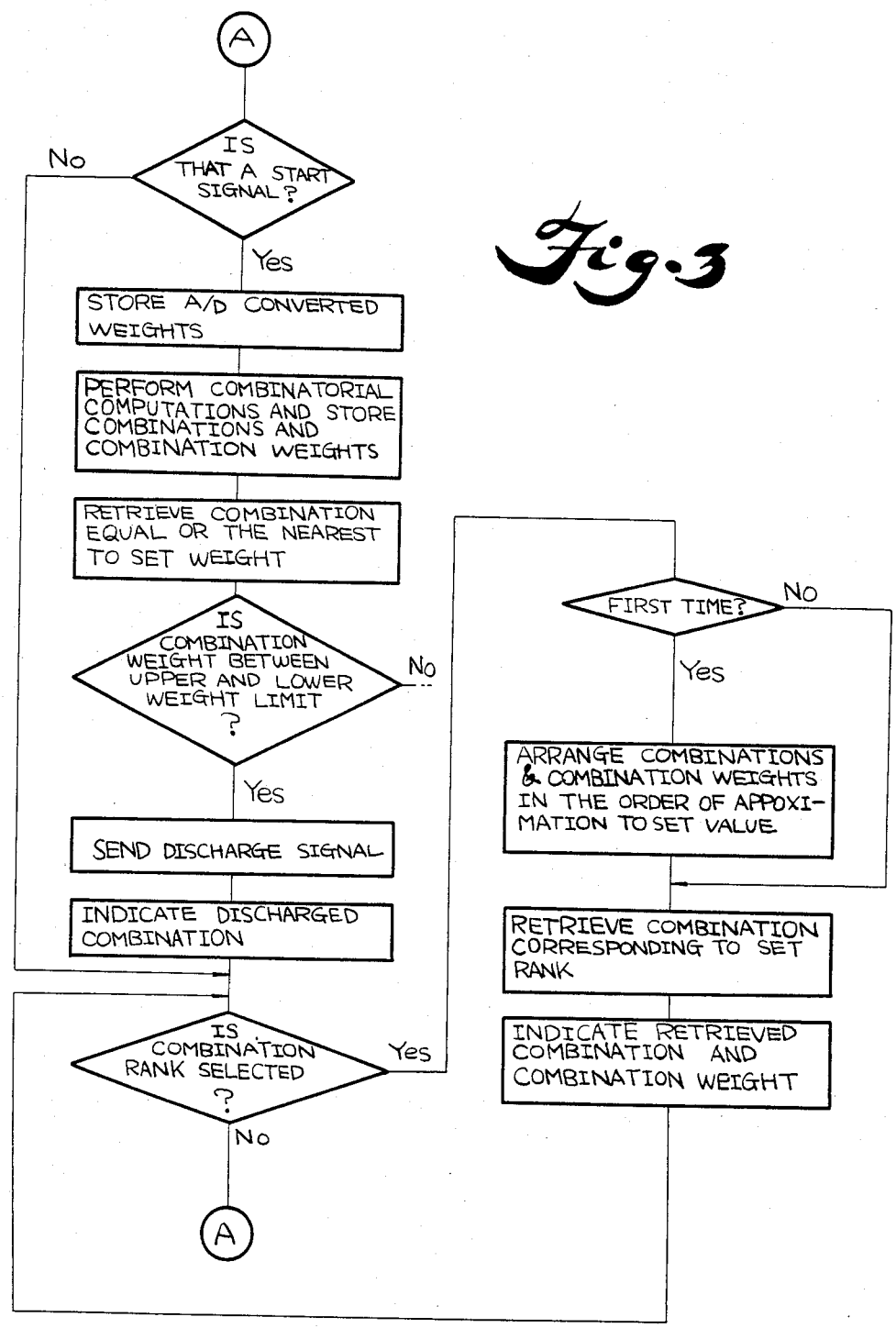

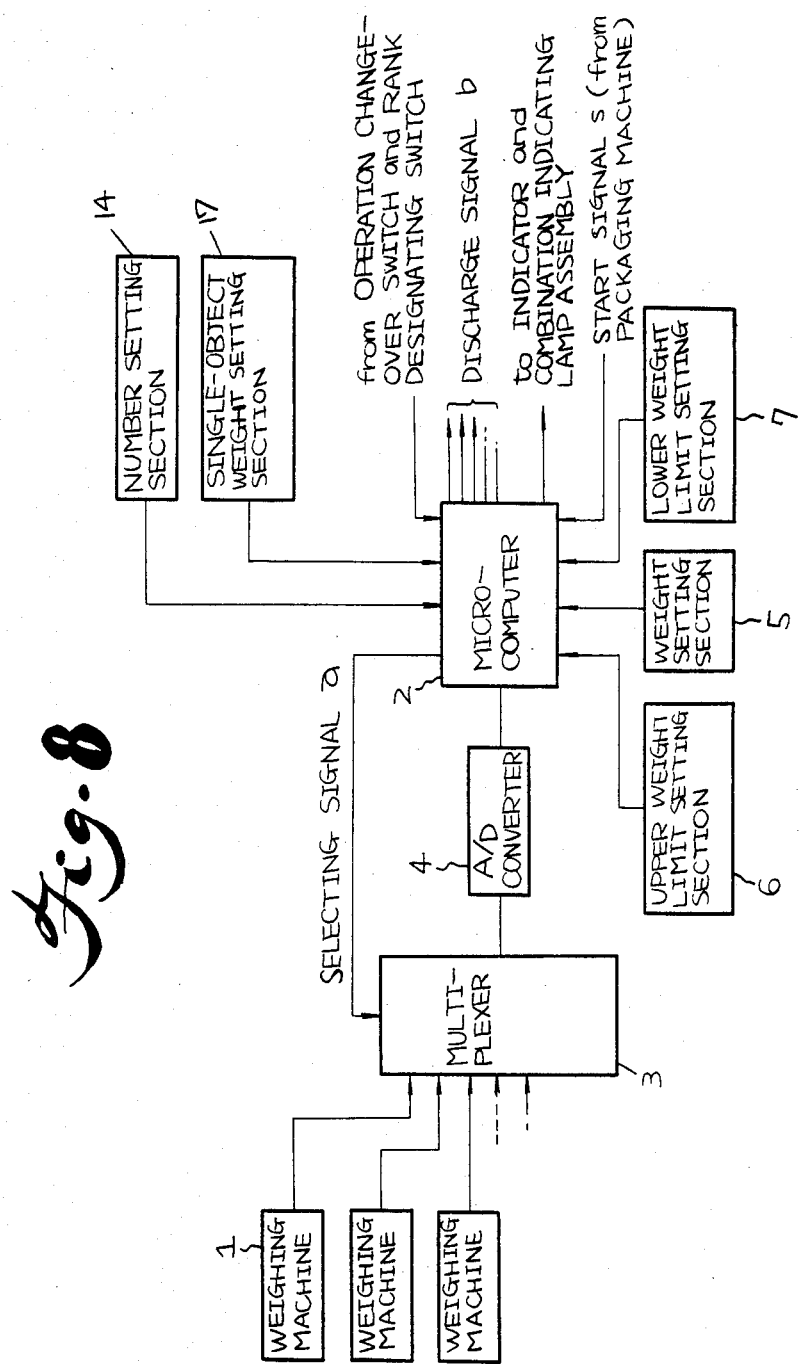

METHOD OF INDICATING RESULTS OF COMBINATORIAL COMPUTATIONS

The present invention relates to an indicating method used in connection with a combinatorial weighing apparatus or combinatorial counting apparatus capable of weighing or counting with high accuracy, and more particularly it relates to an indicating method which is convenient to check whether the microcomputer incorporated in the apparatus for combinatorial computations is correctly operating according to a program assigned thereto and to check variations in the weights in the combinations or the numbers of objects in the combinations.

BACKGROUND OF THE INVENTION

It is known that combinatorial computation and the like operations are performed by a microcomputer in a combinatorial weighing (or counting) apparatus which computes combinations of sets of objects being weighed which vary in weight, retrieves the combination which satisfies a set weight value and discharges it or which computes combinations of sets of objects being counted which vary in number, retrieves the combination which satisfies a set number and discharges it. When objects discharged by such system are later examined by separate weighing (or counting), it is sometimes found that they have been discharged with a value that considerably deviates from the set value. However, it is usual with this type of apparatus that it is utterly impossible to check the computations performed by the microcomputer. Therefore, even if such a trouble occurs, there is no ascertaining whether the trouble is due to errors on the part of the microcomputer or the weighing machines. Further, even if the discharged objects are weighed (or counted) again for check up and found to satisfy the set value, it has been still unknown whether the value is actually the nearest to the set value. More particularly, if a quantity of objects whose weight (or number) is exactly equal to the set value are discharged, there would be no problem, of course, but if a quantity of objects whose weight (or number) is more or less deviated from the set value are discharged, there is no knowing whether the combination of objects whose value is actually the nearest to the set value has been discharged or a combination of objects whose value is, e.g., the second nearest to the set value has been discharged owing to a mulfunction of the microcomputer.

SUMMARY OF THE INVENTION

Accordingly, with the conventional problems as described above in mind, the present invention is intended to improve the same. To this end, the invention provides an indicating method wherein combination weights or numbers obtained by combinatorial computations are indicated as arranged in the order of approximation to a set value or the combination which has the highest degree of satisfaction of the set value is indicated, thereby making it possible to check whether the computations by the microcomputer are correct or to check variations in the results of the computations.

The invention may be divided into two forms according to the mode of indication for check up.

The first form (I) is such that combination weights (or combination numbers) which are the results of combinatorial computations are rearranged in the order of approximation to a set value so that they can be indicated in order.

The second form (II) is such that combinatorial processing is performed again by the same manner as that for combinatorial computations for discharge, to allow the highest degree of satisfaction of a set condition to indicate the first-rank combination, so as to check whether the latter conforms to the discharged combination.

According to the first form (I) of the invention, the results of combinatorial computations are arranged in the order of approximation to a set value and can be thereby checked and by examining the same it is possible to check whether the microcomputer has correctly operated according to a program assigned thereto. Further, by this checkup it is also possible to know variations in the combination weights and combination numbers. According to the second form (II) of the invention, it is possible to check conformity between the discharged combination and the first-rank combination obtained by verification, so as to check that the microcomputer is operating normally. Therefore, according to the first and second forms (I) and (II) of the invention, it is possible to check whether the discharge combination has a value nearest to the set value.

BRIEF DESCRIPTION OF THE DRAWINGS

These and other objects and features of the invention will become apparent from the following description given with reference to the accompanying drawings, in which:

FIG. 3 is a flowchart showing a program for the computer of the apparatus in FIG. 1;

FIG. 8 is a block diagram similar to FIG. 5, showing another combinatorial counting apparatus;

DESCRIPTION OF THE PREFERRED EMBODIMENTS

At the outset, the first form will be described. The first form is subdivided into two cases: one (I-a) where it is applied to a combinatorial weighing apparatus and the other (I-b) where it is applied to a combinatorial counting apparatus.

Figure 1:
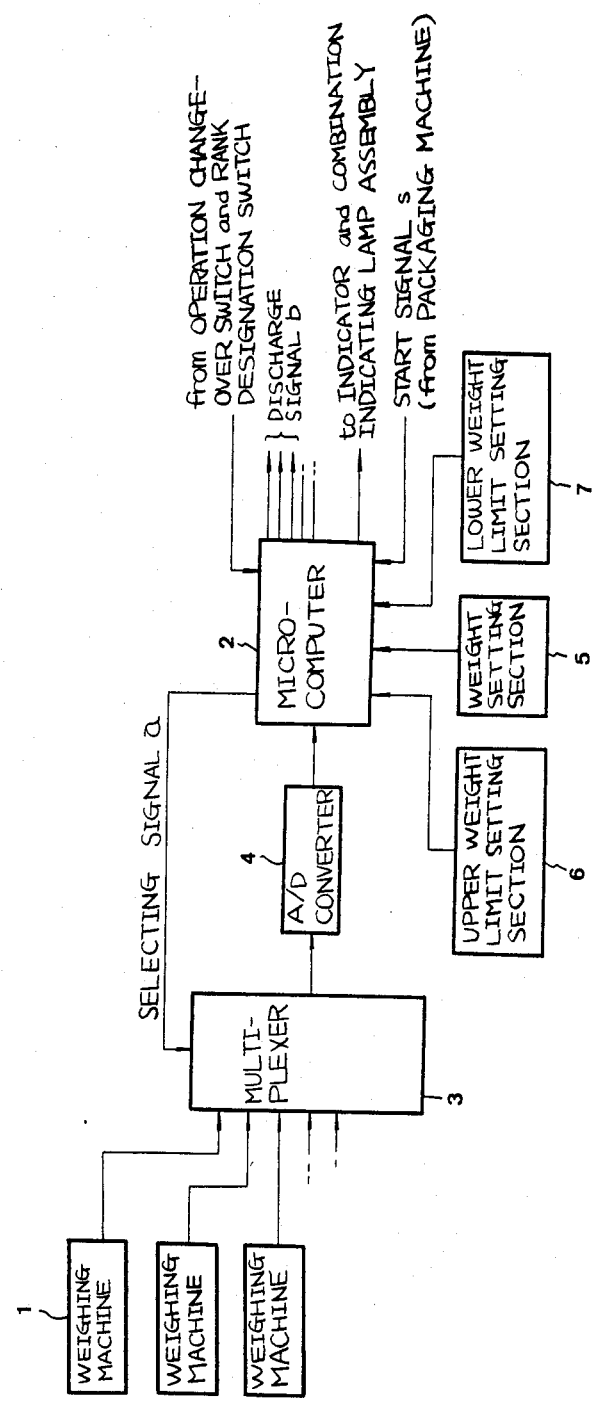
FIG. 1 is a block diagram of a combinatorial weighing apparatus for carrying out the method of the invention.

The case (I-a) where the first form is applied to a combinatorial weighing apparatus will first be described with reference to FIGS. 1 to 3. FIG. 1 shows a combinatorial weighing apparatus using a microcomputer which carries out the method of the invention. In FIG. 1, the numeral 1 denotes a plurality of weighing machines; 2 denotes a microcomputer; 3 denotes a multiplexer adapted to receive selection signals a from the computer 2 to allow selective passage of weight data therethrough, said multiplexer being composed of analog switches. The numeral 4 denotes an A/D converter adapted to receive weight data from the multiplexer 3 and convert the data into digital signals; 5 denotes a weight setting section for imparting a weight setting to the microcomputer 2; 6 denotes an upper weight limit setting section for imparting an upper weight limit to the microcomputer 2; and 7 denotes a lower weight limit setting section for imparting a lower weight limit to the microcomputer 2.

Figure 2:
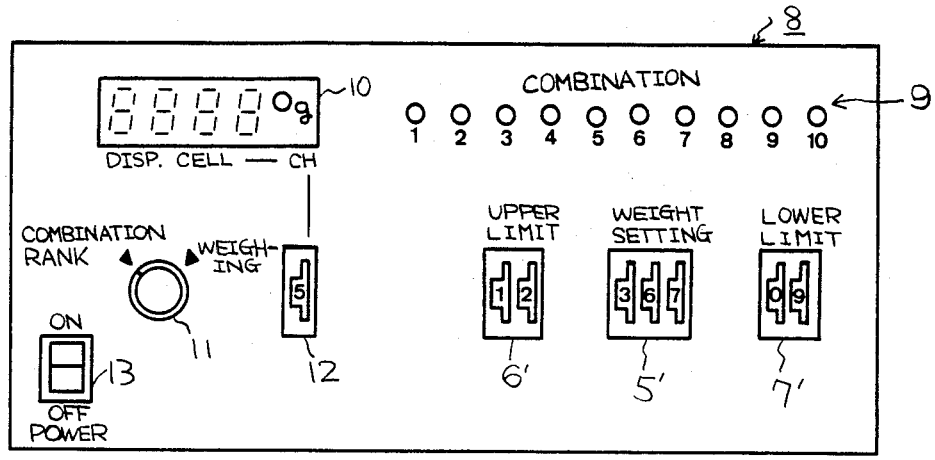
FIG. 2 is a schematic view of an indicating panel in the apparatus of FIG. 1.

An example of an indicating panel for this weighing apparatus is shown in FIG. 2, wherein 8 denotes an indicating panel; 5' denotes a 3-digit digital switch for the weight setting section 5; 6' denotes a 2-digit digital switch for the upper weight limit setting section 6; 7' denotes a 2-digit digital switch for the lower weight limit setting section 7; 9 denotes a combination indicating lamp assembly comprising 10 light emitting diodes or the like corresponding in number to the weighing machines; 10 denotes a 7-segment 4-digit indicator for indicating weight; 11 denotes an operation changeover switch for selecting a weighing operation or a combination rank indicating operation; 12 denotes a rank designating swtich in the form of a 1-digit digital switch for designating a machine number corresponding to a particular weighing machine to cause the weight of objects in that weighing machine to be indicated or designating a combination weight rank to cause the corresponding combination weight to be indicated; and 13 denotes a power switch.

The mode of operation of this apparatus based on an example of a program shown in FIG. 3 is as follows.

A feeder feeds the weighing machines 1 with objects of weighing so that the weights of the sets of objects received by the weighing machines may suitably differ from each other. These sets of objects are individually weighed and their weights are simultaneously inputted into the multiplexer 3 as weight data from the respective weighing machines. Starting at position (A) in the program, the microcomputer 2 judges whether a start signal s, which is produced by a packaging machine when the latter is ready for packaging operation, has been inputted thereinto. If judging that there exists a start signal s, the microcomputer 2 starts its programed operation. Thus, it successively sends selection signals a to the multiplexer 3, so as to allow weight data from the weighing machines 1 stored in the multiplexer to pass through the latter into the A/D converter 4, where the data is then converted into digital signals, which are then stored in the microcomputer 2. Upon completion of storage of all the weight data by the successive feeding of the selection signals a, the microcomputer computes combinations of the weight data and stores the resulting combination weights and the resulting combinations. Then, it retrieves a combination whose weight value is equal or the nearest to the weight setting set in the weight setting section 5 from among the stored combination weights and stores it. And it judges whether the combination weight in this selected combination is between the upper and lower weight limits. If the answer is NO, it judges that weighing is impossible and reports this as by ringing a buzzer. If the answer is YES, it sends object discharging signals b to those weighing machines 1 which correspond to the retrieved and stored combination, causing the weighing machines to discharge the objects of weighing contained therein. This discharged combination is then indicated by the combination indicating lamp assembly 9.

The microcomputer then judges whether the operation changeover switch 11 has selected combination rank. If this has not been selected. it returns to the original position (A) in the program. If combination rank has been selected, it goes to a subroutine for indicating the combined weights by arranging them in the order of approximation to the set value. Upon entry into the subroutine, it first judges whether this entry is the first time after it has completed its combinatorial computations for the sets of objects under consideration. If the answer is YES, it arranges the previously computed and stored combination weights in pairs with the corresponding combinations and in the order of approximation to the weight setting and retrieves the combination which corresponds to the rank designated by the rank designating switch 12. If the answer is NO, since it follows that the rearrangement has already been made, it skips the rearranging step and directly retrieves the combination according to the rank designated by the rank designating switch 12. It then actuates the combination indicating lamp assembly 9 and 7-segment indicator 10 to indicate the retrieved combination and combination weight, respectively, allowing the operator to check the same. Thus, if the operation changeover switch 11 is left switched to combination rank, the routine for this designation is repeatedly executed. Therefore, if the rank changeover switch 12 is manipulated to designate the first rank, second rank, third rank and so on in order, the corresponding combinations and combination weights will be successively indicated. Thus, by checking whether the first-rack combination conforms to the discharged combination and whether there is a close correspondence between the ranks designated by the rank changeover switch 12 and the indicated combination weights, it is possible to know whether the operation of the microcomputer 2 is normal, that is, whether the discharged combination is the nearest to the weight setting, and how the computed combination weights vary.

When the checkup by these indications is completed, the operation selection switch 11 is changed over to weighing operation, whereupon the microcomputer leaves the subroutine and goes back to the original position (A) in the program. It then judges whether there is a start signal s from the packaging machine and, if there is none, it will be kept on standby until a start signal s comes in.

The foregoing is the operation based on the flowchart shown in FIG. 3.

The case (I-b) where the first form of the invention is applied to a combinatorial counting machine will now be described. This case has two types, one (I-b-i) where retrieval is effected solely under the condition of the number of objects and the other (I-b-ii) whee retrieval is effected under the conditions of the number of objects and their weight.

Figure 5:
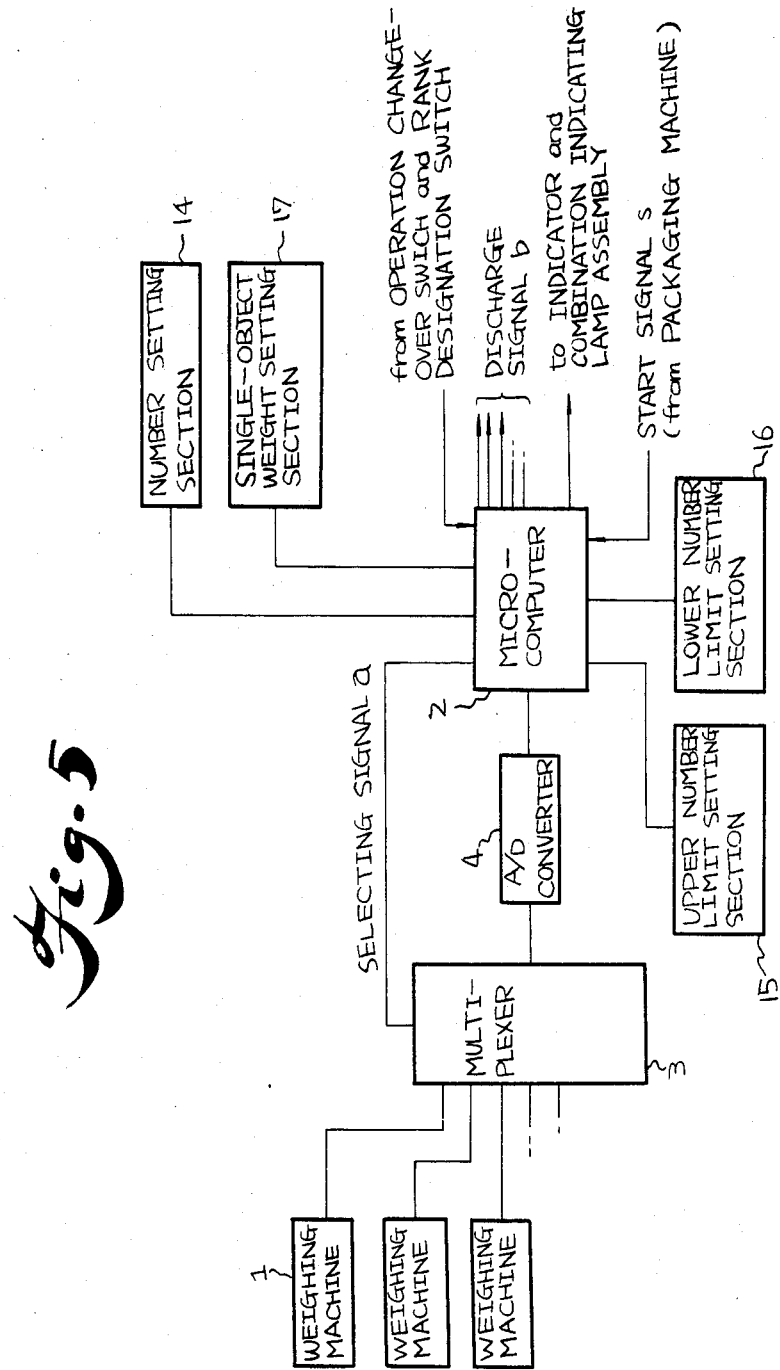
FIG. 5 is a block diagram of a combinatorial counting apparatus for carrying out the method of the invention.
Figure 6:
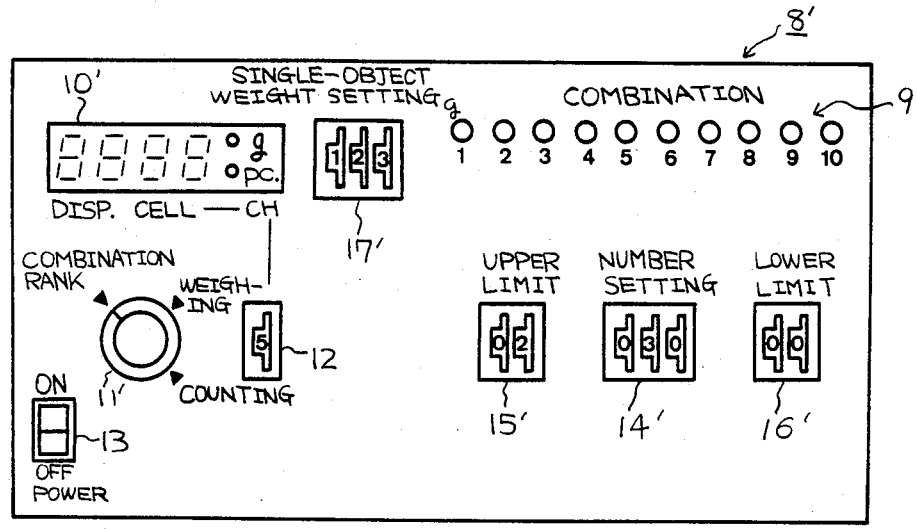
FIG. 6 is a schematic view of an indicating panel in the apparatus of FIG. 5.

First, the case (I-b-i) will be described with reference to FIGS. 5 to 7. FIG. 5 shows a kind of modification of the FIG. 1 embodiment, which differs from the latter in that the weight setting section 5, upper weight limit setting section 6 and lower weight limit setting section 7 are replaced by a number setting section 14, an upper number limit setting section 15 and a lower number limit setting section 16 and in that there is provided a single-object weight setting section 17 for computing the number of objects. An operating panel therefor is as shown at 8' in FIG. 6. As compared with the indicating panel 8 shown in FIG. 6, it differs therefrom in the following respects: the 7-segment 4-digit indicator 10' is capable of selectively indicating weight and number; the operation changeover switch 11' is capable of changing over to number as well as to combination rank and weighing operation; the rank designating switch 12 is capable of designating a machine number corresponding to a particular weighing machine to indicate the number of objects in that weighing machine and also designating a combination number rank to indicate the corresponding combination number; the weight setting sections are replaced by number setting sections 14', 15', 16'; and a 3-digit digital switch 17' is provided for setting single-object weight.

Figure 7:
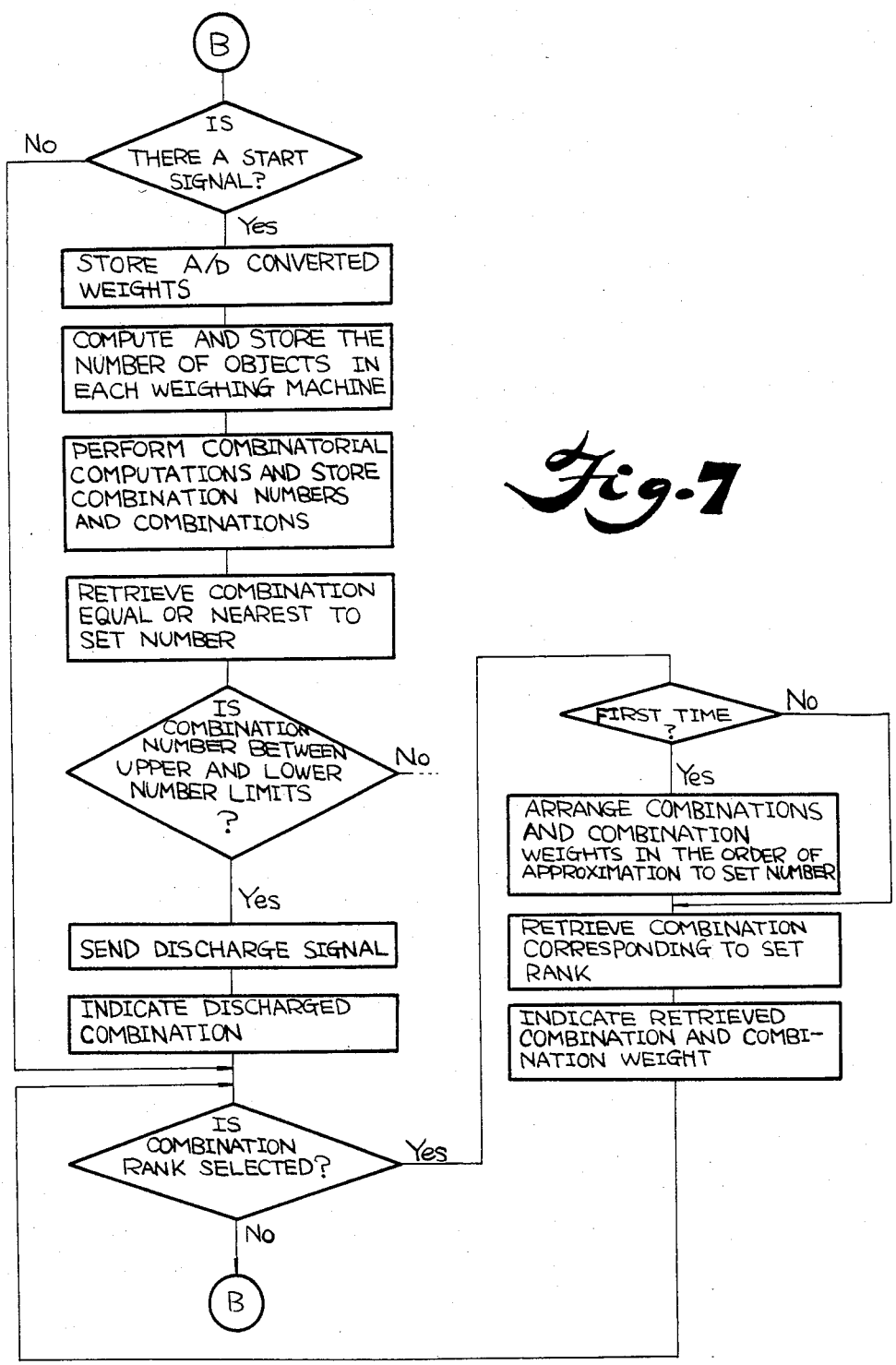
FIG. 7 is a flowchart showing a program for the computer of the apparatus in FIG. 5.

A program for this embodiment may be like a flowchart shown in FIG. 7. According to this program, unlike the one shown in FIG. 3 in which weight data from the weighing machines 1, which is A/D converted, read in and stored, is directly computed for combinations, weight data from each weighing machine 1 is first divided by the single-object weight set by the single-object weight setting section 17 to find the number of objects and after all the numbers thus found have been stored, combinations of these numbers are computed. Some operations which follow differ in that the operations which were performed on the basis of combination weights in the program of FIG. 3 are performed in this case on the basis of combination numbers. The remaining operation are the same as in the case of combination weights in FIG. 3 and a description thereof is omitted.

Figure 9:
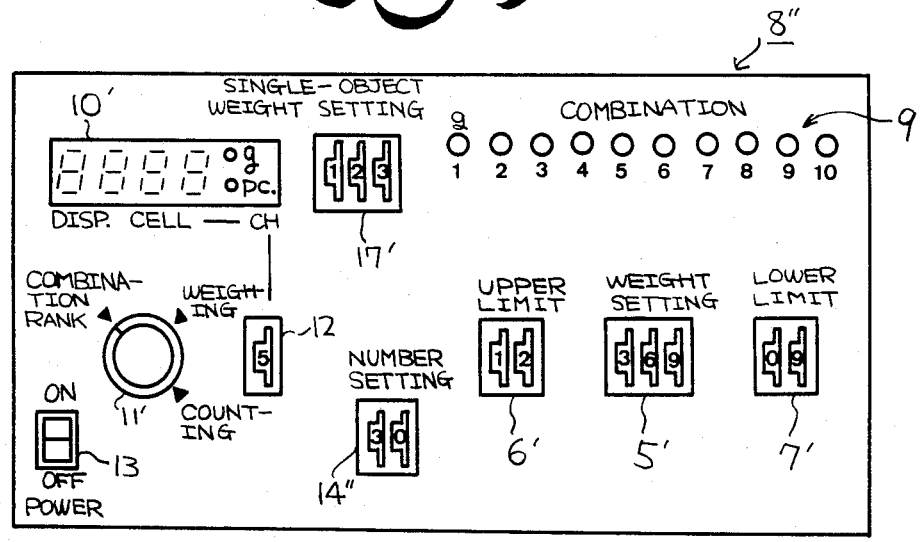
FIG. 9 is a schematic view of an indicating panel in the apparatus in FIG. 8.
Figure 10:
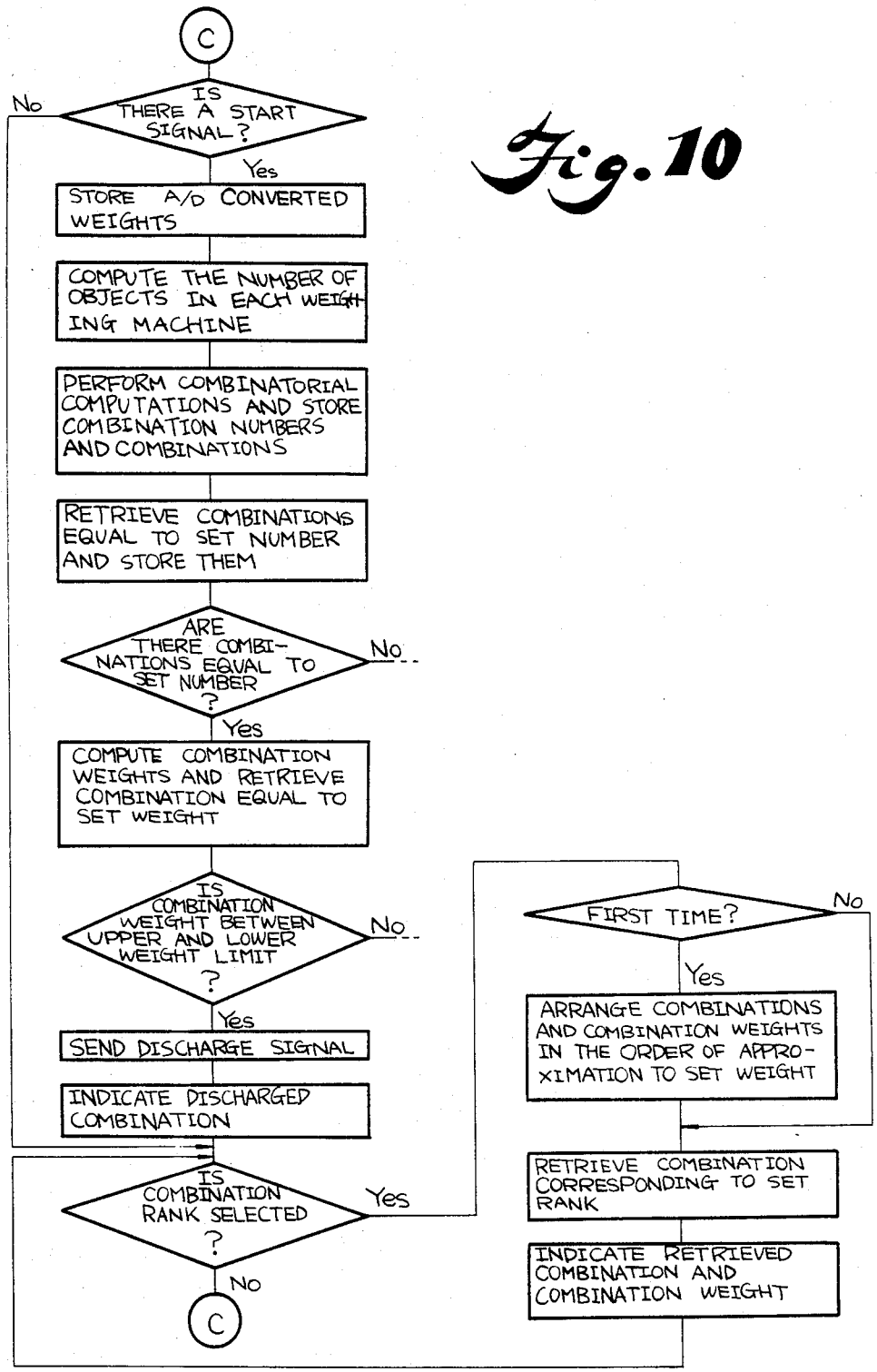
FIG. 10 is a flowchart showing a program for the computer of the apparatus in FIG. 8.

The case (I-b-ii) where the first form of the invention is applied to selection under the conditions of number and weight will now be described with reference to FIGS. 8 to 10. The embodiment shown in FIG. 8 is equal to the embodiment of FIG. 1 plus a number setting section 14 and a single-object weight setting section 17. An indicating panel 8" used in this case is, e.g., one shown in FIG. 9. This is equal to the indicating panel 8 shown in FIG. 2 plus a 3-digit digital switch 17' for single-object weight setting purposes and a 2-digit digital switch 14" for number setting purposes. In addition, the 7-segment 4-digit indicator 10' is adapted to indicate number as well as weight; the operation changeover switch 11' is adapted to select number as well; and the rank designation switch 12 is adapted to designate a machine number corresponding to a particular weighing machine 1 so as to indicate the number of objects in that weighing machine. A program for this embodiment may be drawn up as shown in FIG. 10.

The functioning of this embodiment will now be described with reference to the flowchart shown in FIG. 10.

The microcomputer is kept on standby until a start signal s is fed in or until the operation changeover switch 11' selects combination rank. If the microcomputer judges that there exists a start signal s, it starts to operate for combinatorial counting, while if the operation changeover switch 11' selects combination rank, the microcomputer starts to arrange the combinations in the order of approximation to the weight setting and indicate the particular combination and particular combination weight corresponding to the designated rank.

In the case where a start signal s is fed in, the microcomputer 2 sends selection signals a to the multiplexer 3 to read and store weight data from the weighing machines 1 through the multiplexer 3 and A/D converter 4. It then divides the weight data from each weighing machine 1 by the single-object weight to find the number of objects in each weighing machine and stores these numbers. It computes combinations of these numbers and stores the combination numbers and combinations thus found. It retrieves the combination or combinations which correspond to the number set in the number setting section 14 from among the stored combinations and stores same. It then judges whether there is a number which corresponds to the set number, that is, whether there is any stored number. If the answer to this judgement is negative, it gives an indication of impossibility of counting as by lighting a warning lamp. If the answer is affirmative, it computes combination weight(s) in the stored combination(s) and retrieves the combination whose combination weight is equal or the nearest to the set weight. It then judges whether this selected combination weight is between the upper and lower weight limits. If the answer is NO, it judges that counting is impossible as in the previous case. If the answer is YES, assuming that the selected combination satisfies all the set conditions, it sends discharge signals b to the weighing machines 1 corresponding to the combination to discharge their contents. Further, it causes the indicating lamp assembly 9 to light the corresponding lamps to indicate the discharged combination.

If the operation changeover switch 11' has been turned to combination rank, the microcomputer follows the indication routine. First, it judges whether this entry into the routine is the first time after the start of the corresponding counting operation. If the answer is YES, it computes the combination weight as to the combinations stored as conforming to the set number and arrange them in the order of approximation to the set weight. It then retrieves the combination corresponding to the rank designated by the rank designating switch 12. In addition, if the answer to the above judgement is NO, it goes to the step of retrieval of combination without performing this rearrangement. When the combination has thus been retrieved, the retrieved combination and the combination weight are indicated by the combination indicating lamp assembly 9 and the 7-segment indicator 10', respectively. Thereafter, it judges again whether the operation changeover switch 11' has selected combination rank and, if it is selected, the operation returns to the start of the indication routine, so that the indicating operation continues as far as the operation changeover switch 11' has been connected to the contact point for combination rank. Therefore, if the rank designating switch 12 is manipulated to successively designate the first, second, third .. . ranks, then by knowing the rearranged combinations and combination weights it is possible to check the functioning of the microcomputer, that is, to check whether the discharged combination was the nearest to the set weight and to check variations in the combination weights.

While the discharged combination and the rearranged combinations have been indicated in the foregoing embodiments of the first form of the invention, it is not always necessary to give these indications. In each of the programs (FIGS. 3, 7 and 10) for the embodiments, rearrangement and indication for checking are effected when the operation changeover switch 11 or 11' is changed over to combination rank; however, it may be so arranged that rearrangement is effected subsequently to each weighing or counting operation and that indication alone is effected when the operation changeover switch 11 or 11' is changed over to combination rank. For example, rearrangement may be effected subsequently to indication of discharge based on computations for discharge or the step of retrieving the combination which is equal or the nearest to the set value may be replaced by rearrangement, with the first-rank combination in the resulting rearrangement being the combination to be discharged.

As described above, according to the first form of the invention, by checking whether the program for rearranging combination weights or combination numbers in the order of of approximation to a set value is correctly executed, it is indirectly checked whether the operation of the microcomputer is normal, that is, whether the discharged combination was actually the nearest to the set value.

The second form of the invention will now be described.

According to this form, as combinatorial computations and discharge are effected, the discharged combination is indicated, and the first-rank combination which satisfies the discharge condition is found by the same method as that by which the combination to be discharged was found, so as to check whether it conforms to the discharged combination. That is, the first-time computations for discharge are followed by the second-time computations for verification.

The second-time computations for verification can be performed in two ways; (i) redoing retrieval under the condition of being equal or the nearest to the set value so as to find the first-rank combination, and (ii) redoing combinatorial computations to find the combination equal or the nearest to the set value and making again a judgement of whether the selected combination weight or number is between the upper and lower error limits to find the first-rank combination which satisfies the conditions. The condition for the implementation of the verification (i) is that combination weights (or numbers) have been stored. In the case of implementing the verification (ii), since at the time of verification the relevant weighing machines have already been empty, outputting no weight data, the weight data which was previously A/D converted and read in must remain stored.

In the second form of the invention, it is only necessary to find the first rank. Rearrangement is not always necessary, but when it is desired to find the second and lower ranks, rearrangement may be made in any way.

Figure 4:
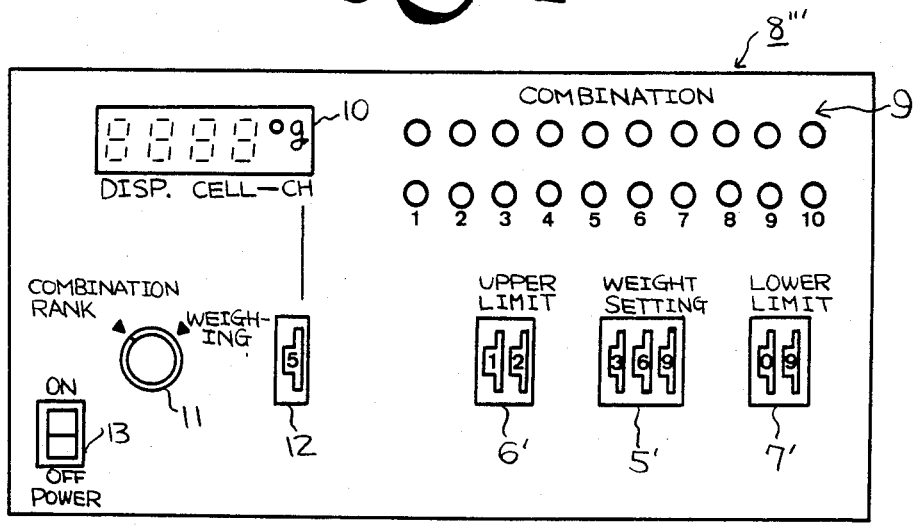
FIG. 4 is a schematic view similar to FIG. 2, showing a modification of an indicating panel.

The timing for rearrangement may be effected manually or automatically. In the case of manual timing, the operation changeover switch 11 or 11' is manipulated to select combination rank, bringing the weighing (or counting) operation to a halt. Then the combinations are rearranged to indicate the first-rank combination so as to check whether the discharged combination conforms to the first-rank combination. In addition, the second form can be executed by simply changing partially the programs described with reference to the block diagrams shown in FIGS. 1, 5 and 8 and the indicating panels shown in FIGS. 2, 6 and 9 in connection with the embodiments of the first form of the invention. The indicating panels 8, 8' and 8" shown in FIGS. 2, 6 and 9 each have only one indicator lamp assembly 9, which is inconvenient for the second form. In this case, an indicating panel 8''' having two indicator lamp assemblies 9 and 9', as shown in FIG. 4, may be used. Thus, the indicator lamp assembly 9 in the upper row is used to indicate the discharged combination while the indicator lamp assembly 9' in the lower row is used to indicate the results of rearrangement.

In the case of automatically setting the timing for rearrangement, combinations are rearranged for each weighing (or counting) operation in order. For example, subsequently to combinatorial computations and discharge and independently of selection made by the operation changeover switch 11 or 11', the combinations are rearranged and the combination corresponding to the rank designated by the rank designating switch 12 is indicated. In this case, two indicating lamp assemblies 9 are absolutely necessary, and the indicating panel 8''' of the type shown in FIG. 4 will be available. Thus, if the rank designating switch 12 is set to the first rank, then the first-rank combination and the combination weight (or number) thereof will be indicated at the same time as discharge, so that in each weighing (or counting) operation it is possible to check whether the indications given by the two combination indicating lamp assemblies 9 and 9' conform to each other. When it is desired to review successively the second, third . . . ranks besides the first rank, the rank designating switch 12 is to be manipulated to designate the first, second, third . . . ranks.

The manual and automatic timings for rearrangement in the second form have been described as arranging the combinations successively in the order of the first, second, third . . . ranks, but in the second form it may be sufficient to find only the first-rank combination; rearrangement is not always necessary. The basic idea of the microcomputer operation checking according to the second form of the invention is to check conformity between the indication of a discharged combination and the indication of the first-rank combination. But it is preferable that the actual apparatus be capable of rearrangement to provide for the accurate checking of the second and lower ranks. In so doing, it is possible by verification to check not only the correctness of the computations, that is, whether the discharged combination was the nearest to the set value, but also variations in combination weights (or numbers). In this case, however, combination weights (or numbers) will be indicated by the 7-segment indicator 10 or the like. In the first and second forms of the invention, if weighing (or counting) is selected by the operation changeover switch 11 or 11', the weights (or numbers) of the sets of objects in the weighing machines 1 corresponding to the first, second, third . . . ranks designated by the rank designating switch 12 are indicated by the indicator 10.

In the first and second forms (I) and (II), the discharged combination alone has been described as being indicated; however, it may be so arranged that if zero is designated by the rank designating switch 12, the discharged combination and the combination weight (or number) thereof are indicated. Further, in the first and second forms, the method of combination weighing or counting may be such that besides finding a particular combination under the conditions that it is equal or the nearest to the set value and is between the upper and lower error limits, as in the foregoing description, it is of course possible to find a combination under any given conditions. For example, the conditions may be such that it is simply equal or the nearest to the set value.

Further, in the first and second forms (I) and (II), the finding of a combination equal or the nearest to the set value may be obtained by any other method than those used in the foregoing embodiments. For example, such combination may be found by selecting every time computation of combination weight is effected either a combination whose combination weight is being computed and a combination whose combination weight is the nearest to the set value in the combinations whose combination weights have already been computed, whichever equal or nearer to the set value.

As many apparently widely different embodiments of this invention may be made without departing from the spirit and scope thereof, it is to be understood that the invention is not limited to the specific embodiments thereof except as defined in the appended claims.

We claim:

1. In a combinatorial system for measuring the respective values of a physical quality of a plurality of sets of objects such as the weight or quantity thereof, computing a plurality of combinatorial values of said measured values, and discharging those sets of objects the total combinatorial value of which most closely approximates a set value, the method of indicating the results of said combinatorial computations comprising the steps of:

arranging said combinatorial values in ranking order of closest approximation to said set value;

storing a numerical value representative of each of said combinatorial values and the combination corresponding thereto;

selectively retrieving one of said stored numerical values by rank and displaying said selected value on a visual numerical display.

2. The method recited in claim 1 including the further step of indicating the rank number of said selectively retrieved numerical value at the same time said numerical value is displayed.

3. The method recited in claim 3 further including the step of indicating the combination corresponding to said selected combinatorial value.

4. The method recited in any one of claims 1, 2 or 3, wherein said step of arranging said combinatorial values is performed upon the combinatorial values computed in the system for discharging those sets of objects which most closely approximate said set value.

5. The method recited in any one of claims 1, 2 or 3, wherein said step of arranging said combinatorial values includes the steps of storing said measured values and of recomputing the combinatorial values to be arranged from said stored measured values.

6. An apparatus for combinatorially measuring a physical quality of a plurality of sets of objects and selecting those sets of objects the combinatorial value of which most closely approximates a desired set value comprising:

means for individually measuring said physical quality of each of said sets of objects and for storing said measurements;

means for performing a plurality of combinatorial computations of said stored measurements and for storing said plurality of combinatorial computations and the corresponding combinations;

means for determining the one of said plurality of combinatorial computations most nearly equal in value to said desired set value, for retrieving the corresponding stored combination, and for discharging said sets of objects corresponding to said retrieved combination;

means for indicating said discharged combination; and means for checking the operation of said combinatorial measuring apparatus comprising means for arranging and storing said combinatorial computations in the order of closest approximation to said desired set value, means for selecting said stored combinatorial computations by numerical rank of closest approximation, and visual diplay means for displaying the numerical value of said selected combinatorial computation and the rank thereof.

* * * * *